United States Patent [19]

Fujino et al.

[11] Patent Number: 4,690,530
[45] Date of Patent: Sep. 1, 1987

[54] CAMERA WITH RELEASE CONTROL AND AUTOMATIC FILM SENSITIVITY SETTING

[75] Inventors: Akihiko Fujino, Sakai; Manabu Inoue, Kobe; Masaaki Nakai, Kawachinagano; Minoru Sekida, Sakai, all of Japan

[73] Assignee: Minolta Camera Kabushiki Kaisha, Osaka, Japan

[21] Appl. No.: 801,912

[22] Filed: Nov. 26, 1985

[30] Foreign Application Priority Data

Nov. 26, 1984 [JP] Japan .......................... 59-178792[U]
Dec. 10, 1984 [JP] Japan .......................... 59-187985[U]
Dec. 10, 1985 [JP] Japan .......................... 59-187986[U]

[51] Int. Cl.⁴ .......................... G03B 1/60; G03B 7/24; G03B 17/38
[52] U.S. Cl. .......................... 354/21; 354/400; 354/412; 354/441; 354/217; 354/268
[58] Field of Search .......................... 354/21, 400, 410, 412, 354/418, 441, 127.1, 127.11, 127.12, 215, 217, 218, 266, 268, 289.1, 289.12

[56] References Cited

U.S. PATENT DOCUMENTS

| | | | |
|---|---|---|---|
| 4,054,888 | 10/1977 | Kozuki et al. | 354/412 |
| 4,135,797 | 1/1979 | Ohmura et al. | 354/127.12 |
| 4,200,371 | 4/1980 | Suzuki et al. | 354/21 |
| 4,304,475 | 12/1981 | Kitai et al. | 354/268 X |
| 4,431,283 | 2/1984 | Hoda et al. | 354/21 |
| 4,435,058 | 3/1984 | Yoshida et al. | 354/403 |
| 4,464,031 | 8/1984 | Iwashita et al. | 354/268 X |
| 4,500,183 | 2/1985 | Tanikawa | 354/21 |
| 4,538,890 | 9/1985 | Ishizaka et al. | 354/21 |

FOREIGN PATENT DOCUMENTS 50-99727 8/1975 Japan .
58-125030 7/1983 Japan .

*Primary Examiner*—W. B. Perkey
*Attorney, Agent, or Firm*—Burns, Doane, Swecker & Mathis

[57] ABSTRACT

A release operation of a camera adapted to be transferred to a normal photographing condition through winding-up of a film by a predetermined length is allowed in conditions before transfer to the normal photographing condition even if a release inhibition signal is being generated. Whether or not the camera is in the normal photographing condition is determined based on the state of a switch which is turned OFF upon transfer of the camera to the normal photographing condition. The turn-OFF of the switch always causes the camera to read a code pattern on a film cartridge to automatically set the film sensitivity represented by the code pattern. The camera is also capable of manual film speed setting. When a new battery is loaded in the camera while it is the normal photographing condition in and while a film cartridge with no code pattern is being used, the camera is adapted to start light measurement and exposure calculation only when a film sensitivity setting switch which allows manual film sensitivity setting is turned ON, thereby urging a camera operator to verify the film sensitivity of the film. In contrast, when a new battery is loaded in the camera while it is in the normal photographing condition when a film cartridge with the code pattern is being used, the camera reads the code pattern upon detection of loading of the battery.

11 Claims, 5 Drawing Figures

CAMERA WITH RELEASE CONTROL AND AUTOMATIC FILM SENSITIVITY SETTING

BACKGROUND OF THE INVENTION

1. Field of the Invention

The present invention relates to a camera shutter release control and automatic film sensitivity setting, and more particularly, such a camera which carries out an exposure operation at a predetermined fast shutter speed until it is transferred to a normal photographing condition, that is, until a film loaded in the camera is wound up to a position where a film counter indicates the frame number "1".

2. Description of Prior Arts

A camera of this type which sequentially carries out an exposure operation at a predetermined fast shutter speed until transfer to a normal photographing condition is known by Japanese Patent Laid-open Publication No. 125030/1983. The camera of this type is advantageous since it can be transferred to the normal photographing condition quickly.

On the other hand, a shutter release operation is inhibited in some cameras under a bad-exposure condition. For example, there are cameras which inhibit a release operation until a proper focus condition is achieved by automatic focusing and also cameras which inhibit a release operation until an electronic flash device becomes ready for flashing. It is the concept of these cameras that a release operation should be inhibited until achievement of a proper photographing condition.

However, if such a concept is used for the camera of the type disclosed in the Japanese publication, shutter release operation is inhibited if a proper photographing condition is not achieved even before transfer to the normal photographing condition i.e., before the film is advanced to the first frame. If the camera is constructed in a conventional manner to allow a film winding-up operation only after completion of an exposure operation started by a shutter release operation, the inhibition of a release operation also leads to inhibition of a film winding-up operation, so that the camera cannot be transferred to the normal photographing condition until achievement of a proper photographing condition. Accordingly, it takes a long time for the camera to be transferred to the normal photographing condition, and sometimes a shooting chance is missed.

By the way, a film cartridge having a code pattern on its outer circumference is available recently in the market. The code pattern represents the film sensitivity (hereinafter referred to as ISO) of the film contained in the cartridge. The code pattern makes it possible for a camera to automatically set the ISO value of the film being used. Such cameras capable of reading the code pattern for automatic setting of the ISO value of the film being used are disclosed in U.S. patent Nos. 4,431,283 and 4,200,371. The code pattern may be read at various times, for example, (i) during each exposure operation, (ii) upon loading of a film cartridge into a camera, and (iii) upon closure of a rear cover of a camera. Here, (ii) and (iii) are the cameras disclosed in U.S. patent Nos. 4,200,371 and 4,431,283, respectively.

If the cited camera of the type known by the Japanese publication No. 125030/1983 is constructed to read the code pattern for automatic setting of the ISO value of the film being used, it becomes more convenient to a camera operator. However, if the code pattern is read at any of the times (i), (ii) or (iii) mentioned above, the camera will suffer from the following disadvantages:

(a) In (i), the number of the reading operators increases, resulting in much consumption of electric power. This disadvantage becomes more serious if the camera is constructed to automatically wind-up and rewind a film by using an electric motor, as many recent cameras are.

(b) In the case of the (ii) or (iii), consumption of electric power is not a problem since the reading of the code pattern is effected only once per film cartridge. However, the camera must have either a detection member for detecting the loading of a film cartridge or a detection member for detecting the closure of the rear cover of the camera. As the camera is already necessarily provided with a detection member that changes from a first state to a second state upon transfer of the camera to the normal photographing condition, addition of an extra detection switch as described above makes it difficult to produce the camera at a low cost as well as to design the same to be light and compact.

The camera constructed to read the code pattern for automatic ISO-value setting should also allow manual ISO-value setting for accommodation to a film cartridge with no code pattern. In the case where the automatically set ISO value or the manually set ISO value is stored in an electric storage means, the ISO value stored in the storage means is erased when an old battery of the camera is replaced with a new one, causing the problem that the camera may be unable to effect correct exposure control and the camera operator can not recognize it. Such a problem will occur particularly when the battery replacement is carried out while the camera is in the normal photographing condition, that is, in case some frames of the film are left unexposed. Use of a back-up battery or a back-up capacitor is one method to solve the problem. But this method makes it necessary to provide the camera with a special chamber to receive the back-up battery or the back-up capacitor causing the new problem that the camera becomes bulky.

OBJECTS OF THE INVENTION

It is accordingly an object of the present invention to provide a camera capable of being transferred to a normal photographing condition quickly independently of whether a proper photographing condition i.e., correct exposure is achieved or not.

Another object of the present invention is to provide a camera which is additionally characterized by common use of a detection means for detecting the transfer of the camera to the normal photographing condition and for causing the camera to read a code pattern of a film cartridge for automatic setting of the ISO value of the film contained in the cartridge.

Still another object of the present invention is to provide a camera which can solve the problem of erroneous exposure control caused by replacement of an old battery with a new one under the normal photographing condition, without use of a back-up battery or a back-up capacitor.

SUMMARY OF THE INVENTION

According to a camera of the present invention, camera condition determining means determines whether or not the camera is in a normal photographing condition i.e., when film is loaded and advanced to the first frame, at least, based on the state of switch means which is changed over from a first state to a second state upon transfer of the camera to the normal photographing condition. Signal generating means generates a release inhibition signal under a condition of the camera in which it is undesirable to start an exposure operation. However, release control means, which is adapted to inhibit the camera from being released to start an exposure operation in response to the release inhibition signal, allows the camera to be released independently of the release inhibition signal when the determining by the camera condition determination means indicates that the camera is not in the normal photographing condition. The camera of the present invention constructed as described so far can be transmitted to the normal photographing condition quickly since a release of the camera and a succeeding film winding-up operation can be effected even under a bad-exposure condition. Accordingly, it is free from the problem of missing a shooting chance because of the camera being not transferred to the normal photographing condition quickly.

Additionally, according to the camera of the present invention, code pattern reading means read a code pattern representing the ISO value of the film contained in a film cartridge if such a code pattern is provided on the film cartridge while camera condition transfer detection means detects the transfer of the cameera to the normal photographing condition based on the change-over of the switch means from the first state to the second state. The code pattern reading means is controlled by reading control means causing it to read the code pattern upon the detection of the transfer of the camera to the normal photographing condition. As the switch means is commonly used to determine the time of the reading of the code pattern by the code pattern reading means, the camera of the present invention does not need any other detection member such as a cartridge loading detection member or a rear cover closure detection member as described earlier. This makes it possible to produce the camera of the present invention at a low cost and to construct the same to be light and compact.

Further, according to the camera of the present invention, manual film sensitivity setting is allowed when manual film sensitivity setting means is operated while cartridge discriminating means discriminates whether or not the film cartridge being used of the type with the code pattern. Additionally, battery loading detection means detects whether or not a new battery is loaded into the camera in replacement of an old one. The camera is caused to start an exposure calculation by camera operation starting means in response to a manual operation of the manual film sensitivity setting means when loading of the new battery is detected by the battery loading detection means. This occurs when the determination by the camera condition determining means indicates that the camera is in the normal photographing condition and the discrimination by the cartridge discriminating means indicates that the film cartridge being used is not the type with the code pattern. In this way unless the film sensitivity setting means is manually operated by a camera operator, the camera cannot start an exposure calculation and accordingly the camera operator is prompted to verify the ISO value of the film being used.

Furthermore, according to the camera of the present invention, another camera operation starting means is provided but the release control means can inhibit the camera from starting an exposure calculation in response to a manual operation of this camera operation starting means. Inhibition occurs when loading of the new battery is detected by the battery loading detection means and the determination by the camera condition determining means indicates that the camera is in the normal photographing condition and the discrimination by the cartridge discriminating means indicates that the film cartridge is not of the type with the code pattern. This makes it sure that the manual film sensitivity setting means is the only means to cause the camera to start an exposure operation for such conditions. However, whenever the determination by the camera condition determining means indicates that the camera is not in the normal photographing condition, the release control means does not inhibit so that the camera can start an exposure calculation in response to a manual operation of any of the camera operation starting means. Meanwhile, another reading control means to read the code causes the code pattern reading means upon loading of the new battery, so that the ISO value of the film is automatically read in case the film cartridge is of the type with the code pattern. As a consequence, the camera of the present invention is free from the problem of erroneous exposure control caused by replacement of an old battery with a new one.

The above and other objects and features of the present invention will become more apparent from the following description of a preferred embodiment of the present invention taken in conjunction with the accompanying drawings.

DESCRIPTION OF A PREFERRED EMBODIMENT

Figure 1:
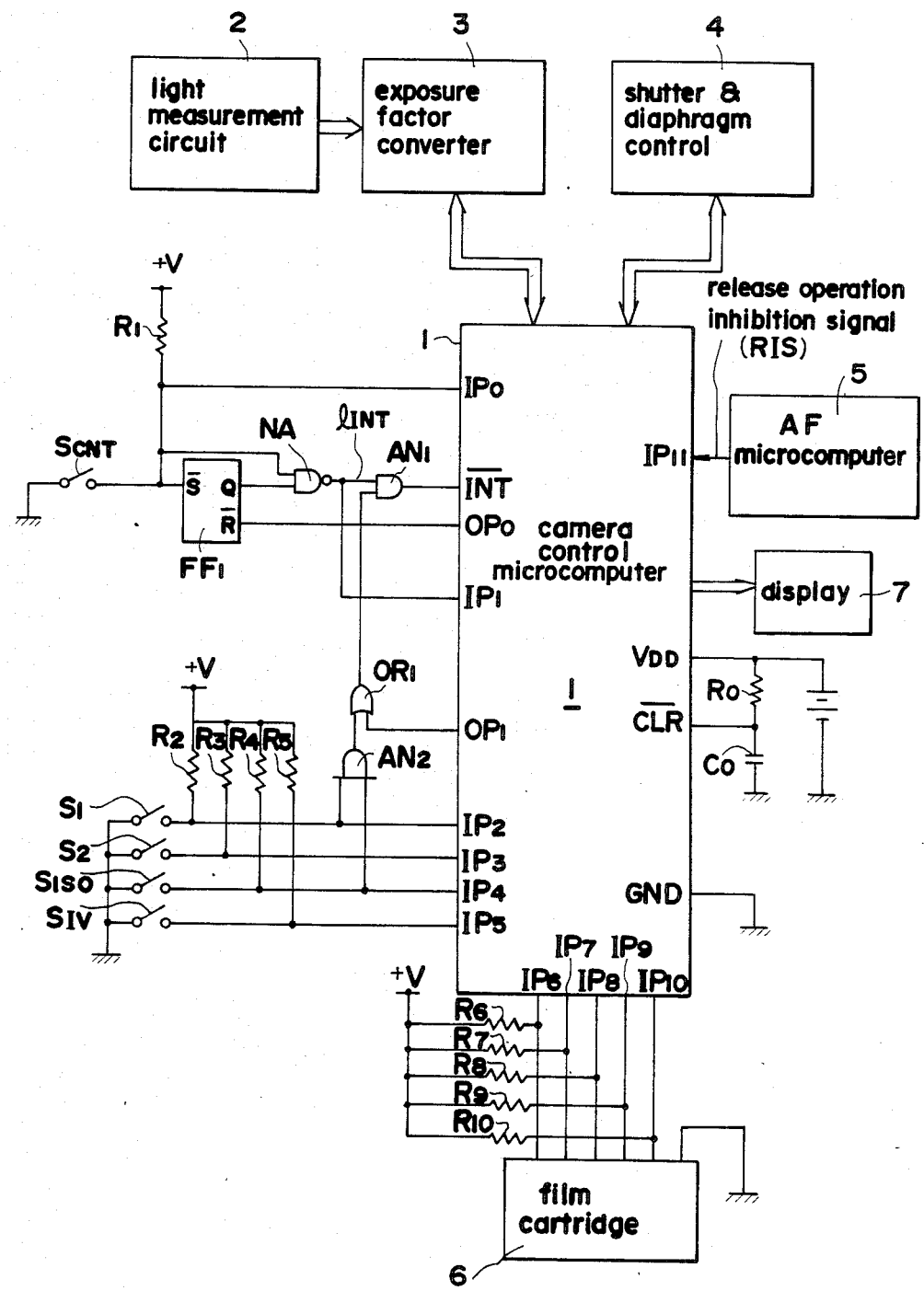
FIG. 1 is a circuit diagram showing a circuit arrangement of a camera according to an embodiment of the present invention.

In FIG. 1 illustrating a circuit arrangement of a camera according to a preferred embodiment of the present invention, a control microcomputer 1 controls operations of the camera and a light measuring circuit 2 measures brightness of an object. An exposure factor converter 3 converts the measured brightness, a preset shutter speed a set aperture value into Bv value, Tv value and Av value according to the APEX notation, respectively. A diaphragm and shutter speed control means 4 controls a diaphragm and a shutter not shown. Another microcomputer 5 (hereinafter referred to as AF microcomputer) is used to automatically adjust the focus condition of a picture taking lens not shown. The camera is loaded with a film cartridge 6 having a code pattern at its outer circumference while a conventional film cartridge not having such a code pattern is also used with the camera. The code pattern of the film cartridge 6 is referred to as DX code and is provided with five code areas which are selectively conductive and nonconductive with a common area of the code pattern in accordance with ISO value of the film contained in the film cartridge. Thus, the code pattern indicates the ISO value of the film contained in the film cartridge 6. It should be noted that at least one of the five code areas is conductive with the common area for every available ISO value so that conduction of at least one of the five code areas with the common area is indicative of a film cartridge with the code pattern.

Figure 3:
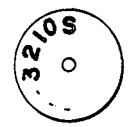
FIG. 3 is a plan view of a counter dial of a film counter mechanism employed in the embodiment.

A display means 7 displays exposure data such as an ISO value. A switch $S_1$ is a light measurement start switch which is closed at the first stage of depression of a release button not shown and causes a preparatory operation (light measurement and exposure calculation) for exposure control. A switch $S_2$ is a release switch which is closed at the second stage of depression of the release button and causes start of exposure control. A switch $S_{ISO}$ is an ISO setting switch, and a switch $S_{IV}$ is an ISO alteration switch for altering a preset ISO value. A preset value of ISO can be changed by turning ON switch $S_{IV}$ while turning ON ISO setting switch $S_{ISO}$. The switches $S_1$ and $S_{ISO}$ also serve as a start switch which starts the control microcomputer 1,. A switch $S_{CNT}$ is a film counter switch which turns ON and OFF in accordance with a counting by of a film counter mechanism (not shown) which operates during film winding. FIG. 3 shows a counter dial of the film counter mechanism. The switch $S_{CNT}$ turns ON when the back cover of the camera is opened and turns OFF when the back cover is closed and the count of film counter mechanism moves to "1" from "0"., this switch $S_{CNT}$ is OFF under a normal photographing condition and ON under conditions before transfer to the normal photographing condition. R1 and R10 are pull-up resistors. A resistor R0 and a capacitor C0 form a power-up clear circuit which generates a signal for starting control microcomputer 1 when a battery is loaded into the camera.

Input and output terminals of the control microcomputer 1 are explained below. $V_{DD}$ is power supply input terminal; GND is ground terminal; IP0, IP2, IP3, IP4 and IP5 are respectively monitor terminals for monitoring conditions of the film counter switch $S_{CNT}$, the light measurement start switch $S_1$, the release switches $S_2$, the ISO setting switch $S_{ISO}$, and the ISO alteration switch $S_{IV}$; IP6 to IP10 are input terminals for reading the code pattern representing the ISO value of the film contained in the film cartridge 6; IP11 is an input terminal for receiving a release operation inhibition signal RIS produced by the AF microcomputer 5 when a picture-taking lens not shown is out of focus; OP0 is an output terminal for generating a reset signal resetting an RS flip-flop FF1; OP1 is an output terminal for generating a signal which is usually set to a low level (hereinafter referred to as "L") and becomes a high level (hereafter referred to as "H") when the control microcomputer 1 is started; $\overline{INT}$ and $\overline{CLR}$ are input terminals which receive signals for starting the control microcomputer 1. More particularly, the control microcomputer is started when a signal received by terminal $\overline{INT}$ falls from H to L and when a signal received by terminal $\overline{CLR}$ rises from L to H, respectively.

Start of the control microcomputer 1 in the present embodiment means that a crystal oscillator (not shown) starts oscillation at a basic frequency in response to power supplied thereto the oscillator is used to operate the control microcomputer for processing signals in a time-serial manner. Conversely, halt of the control microcomputer means that the signal processing operation is disabled in response to stoppage of the oscillation of the crystal oscillator and the control microcomputer holds the signal condition at this time.

The operation of the circuit of FIG. 1 constituted as described above will now be explained for different conditions. Start of the control microcomputer by loading a battery.

Figure 2:
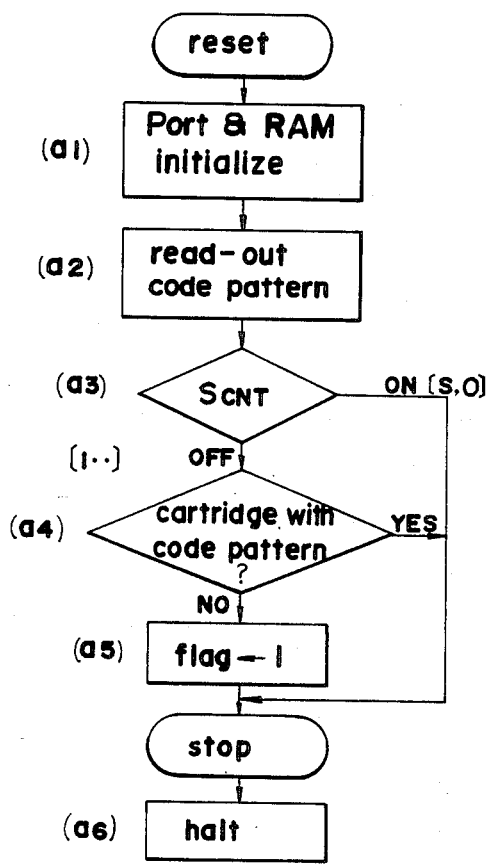
FIG. 2 is a flow chart illustrating the operation steps of a control microcomputer 1 in a reset routine (RESET)

In FIG. 1, when a battery is loaded into the camera, power is supplied to the control microcomputer 1 through the input terminal $V_{DD}$ and a signal which changes to "H" from "L" is applied to the input terminal $\overline{CLR}$. Thereby, the control microcomputer 1 is started and its operation step enters the reset RESET shown in FIG. 2. In this routine, the devices in the control microcomputer 1 such as ports and RAMs, etc. are first initialized at the step (a1) and then the code pattern of the film cartridge 6 is read at the step (a2). It is judged at the step (a3) whether the film counter switch $S_{CNT}$ is ON or OFF through the input terminal IP0. In particular, it is judged that the film counter switch $S_{CNT}$ is on if the input terminal IP0 is receiving a "L" signal. It is also judged at the step (a4) whether a film cartridge 6 with the code pattern is used or not through the input terminals IP6 to IP10. When a film cartridge 6 with the code pattern is used, a "L" signal is applied to at least one of the input terminals IP6 to IP10 corresponding to the code areas of the film cartridge that are conductive with the common area. On the basis of the results of such judgements, it is determined at the step (a5) whether a flag should be set or not. The control microcomputer 1 is halted at the step (a6). The flag inhibits the control microcomputer 1 from being started by the operation of the switches other than the ISO setting switch $S_{ISO}$ prompting the camera operator to manually set an ISO value.

In case a film cartridge with the code pattern is used upon loading of a battery When a battery is loaded in to the camera, an ISO value 100 is stored as the initial setting value in a storage means of the control microcomputer (1). If a film cartridge 6 with the code pattern is in use at this time, the control microcomputer 1 reads the code pattern on the film cartridge through the input terminals IP6 to IP10 at step (a2) of the reset routine and the ISO value of the film in the cartridge is stored in the storage means. The stored ISO value is displayed by the display means 7.

In case a DX film cartridge with no code pattern is use upon loading of a battery When a film cartridge which is not provided with a code pattern indicating a film sensitivity at its external circumference is in the camera when the battery is loaded, the ISO value 100 stored in the storage means as the initial setting value is displayed by the display means 7. However, the ISO value of film is not always 100: it takes various values. Therefore, if the camera operator who relies on the display by the display means 7 depresses the release button without changing the ISO value, an erroneous exposure may occur in some cases. To prevent occurrence of such an erroneous exposure, the flange is set at the steps (a3), (a4) and (a5) of the reset program and the control microcomputer 1 is inhibited from being started until the ISO setting switch $S_{ISO}$ is once turned ON. Thereby, the operator can be urged to verify the ISO value.

If the flag were set before transfer of the camera to the normal photographing condition (contrary to the case of the present embodiment), start of the control microcomputer would be inhibited and the display means 7 would not display a shutter speed and an aperture value. The camera operator might then think that the camera was out of order. For this reason, it is preferable not to set the flag before transfer to the normal photographing condition. Furthermore, in the case where the ISO value of the film in the cartridge being used is other than 100, the camera operator may manually set the ISO value (by turning on the ISO alteration switch $S_{IV}$ while turning ON the ISO setting switch $S_{ISO}$) after loading of the film cartridge, so that the setting of the flag before transfer to the normal photographing condition is unnecessary. Namely, even with the flag once set, it is reset by the turn-ON of the ISO setting switch $S_{ISO}$.

Even if a film cartridge with no code pattern is used, the flag is not set when the camera is not in the normal photographing condition, namely, when the film count switch $S_{CNT}$ is ON (see the RESET step (a3)). This is preferable because the possibility that the camera operator doubts the reliability of the camera is avoided. More particularly, as the preset ISO value 100 is displayed by the display means 7, after replacement of a battery upon use of a film cartridge with no code pattern, the camera operator may mistakenly think that the ISO value 100 has been automatically set if the ISO value of the film in the film cartridge being used in face is 100. The operator therefore may then, mistakenly, depress the release button to turn ON the light measurement start switch $S_1$ for preparation of exposure control.

Display of the ISO value by the display means is deferred until the camera operation program enters the interrupt routine INT by a start of the control microcomputer 1. This will be described later.

Figure 4:
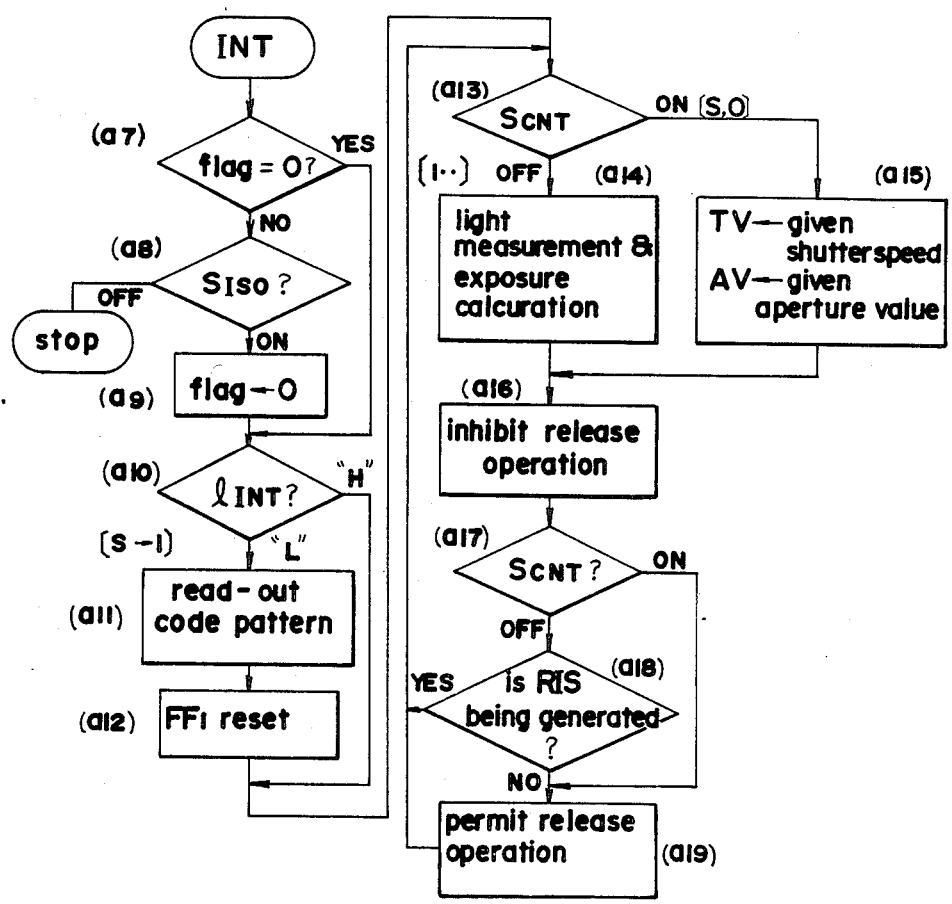
FIG. 4 is a flow chart illustrating the operation steps of the control microcomputer 1 in an interrupt routine (INT)

Start of the control microcomputer 1 by switches $S_1$ and $S_{ISO}$;

When either the switch $S_1$ or $S_{ISO}$ is turned ON, the AND circuit AN2 generates a "L" signal to an input terminal of the OR circuit OR1. The signal from the output terminal OP1 which is connected to the other input terminal of the OR circuit OR1 is "L" because the control microcomputer 1 has not been started yet, and therefore the OR circuit OR1 generates a "L" signal to the AND circuit AN1, which in turn generates a "L" signal to the terminal $\overline{INT}$. The control microcomputer 1 is started in response to the falling edge of this signal and the operation program enters the interrupt routine INT shown in FIG. 4. Simultaneously, the control microcomputer 1 generates a "H" signal to the OR circuit OR1 from the output terminal OP1 so that the output of the OR circuit OR1 remains "H" even if the start switch $S_1$ or $S_{ISO}$ is turned ON again. This is necessary to prevent the control microcomputer 1 from re-starting from the beginning of the routine (INT) when the switch $S_1$ or $S_{ISO}$ is reactivated while the control microcomputer 1 is already running in this routine (INT).

Start of the control microcomputer by the counting operation

When the back cover is opened, the film counter switch $S_{CNT}$ is turned ON setting the RS flip-flop $FF_1$ and therefore an "H" signal is generated from the output terminal Q of this flip-flop to an input terminal of the NAND circuit NA. However, a "L" signal is fed to another input terminal of the NAND circuit NA because the switch $S_{CNT}$ is ON, so that the NAND circuit NA generates an "H" signal. After loading of a film cartridge, the back cover is closed and the film in the cartridge is wound-up. The film winding-up may be effected either manually or automatically in this embodiment. In response to the film winding-up, display of the film counter changes from "S" meaning "start". When the display changes from "0" to "1" indicating transfer of the camera to the normal photographing condition, the film counter switch $S_{CNT}$ is turned OFF causing the NAND circuit NA to generate a "L" signal. Upon receipt of this signal, the AND circuit AN1 generates a "L" signal to the input terminal $\overline{INT}$. The control microcomputer is started in response to the falling edge of this "L" signal and the operation program enters the interrupt routine INT shown in FIG. 4.

Start of the control microcomputer by the ISO setting

In the interrupt routine (INT), the control microcomputer 1 first judges at the step (a7) whether the flag (from the RESET routine) has been set or not.

If the flag has been set, the control microcomputer judges at the next step (a8) whether the ISO setting switch $S_{ISO}$ is ON or not. If it is not ON, the control microcomputer 1 is halted (Stop). This means that the ISO value has not been verified yet when a battery is loaded (replace) while the camera is under the normal photographing condition and where the film cartridge being used has no code pattern.

In the case where the ISO setting switch $S_{ISO}$ is ON, it is considered that the ISO value has been verified. In this case the flag is reset at the step (a9) and the operation proceeds to the step (a10).

Reading of the code pattern upon transfer to the normal photographing condition

Figure 5:
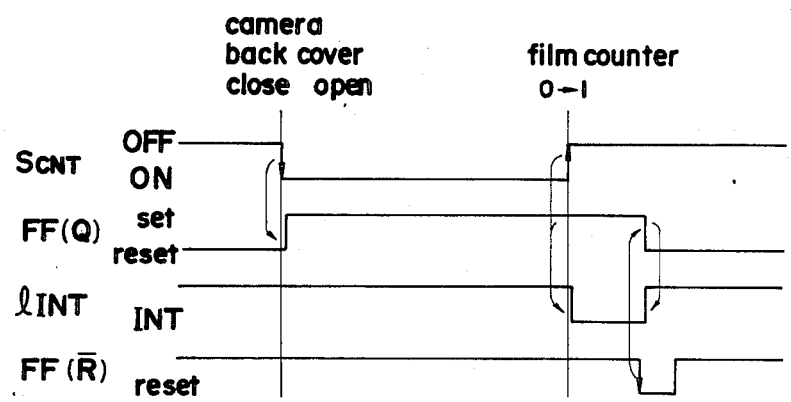
FIG. 5 shows waveforms of some signals appearing in the circuit shown in FIG. 1.

If it is judged at the step (a7) that the flag has not been set, the operation program proceeds directly to the step (a10) at which the signal $1_{INT}$ which is the output of the NAND circuit NA is checked. The output $1_{INT}$ of the NAND circuit NA is "L" when the operation program enters this interrupt routine in response to an interruption caused by the transfer to the normal photographing condition, i.e., the change-over of the film counter switch $S_{CNT}$ from the ON state to the OFF state. In this case, the code pattern of the film cartridge 6 with the code pattern is read at the step (a11) and the ISO value of the film in the cartridge is displayed by the display means 7. If a film cartridge with no code pattern is used, a previously stored ISO value is displayed by the display means 7 and a signal which becomes "L" momentarily is generated from the output terminal OP0. The RS flip-flop FF1 is reset by this signal at the program (a12) and the operation step proceeds to the step (a13) (See FIG. 5). Conversely, the output $1_{INT}$ of the NAND circuit NA is "H" when the operation program enters the interrupt routine in response to an interruption caused by the turn-ON of the switch $S_1$ or $S_{ISO}$. In this case, the operation step proceeds directly to the step (a13) from the program (a10).

Release and exposure control

Controls for photographing are carried out in the closed loop of the steps (a13) to (a19). In the step (a13), it is judged whether the film counter switch $S_{CNT}$ is ON or not. When it is ON, namely before transfer to the normal photographing condition, a given aperture value and a given shutter speed, for example, the maximum aperture value and the fastest shutter speed, are set at the step (a15). Here, the setting of the shutter speed to the fastest value makes it possible to transfer the camera to the normal photographing condition quickly. It should be noted that it is unnecessary to have optimum exposure conditions before transfer to the normal photographing condition. If the settings at the step (a15)

have been done, a release inhibition signal RIS that is input to the terminal IP11 from the AF microcomputer 5 is ignored and a release operation is allowed (at the steps (a17), (a18) and (a19). The release inhibition signal is to inhibit a release operation when proper focusing has not been attained to prevent photographing taken in an out-of-focus condition. However, before transfer to the normal photographing condition, it is not important whether a proper focusing has been attained or not. Furthermore, in the case of a camera constructed to allow a film winding-up operation only after a release operation and an exposure operation, film winding cannot be effected until the release inhibition signal RIS disappears due to achievement of a proper focus condiiton. It may take a long time for such a camera to move to the normal photographing condition. Therefore, even if the release inhibition signal is being generated, it is reasonable to allow a release operation before transfer to the normal photographing condition so that the camera can be transferred to the normal photographing condition quickly. When the release switch S2 is turned ON by depression of the release button to the second stage, the input terminal IP3 receives a "L" signal and the control microcomputer 1 carries out an exposure operation at the predetermined aperture value and shutter speed.

After transfer to normal photographing condition, the whether the film count switch $S_{CNT}$ is OFF is judged at the step (a13). If it is, the control microcomputer 1 carries out calculation of a proper shutter speed and a proper aperture value based on the light measurement at the step (a14). When the release switch S2 is turned ON after achievement of proper focusing or when proper focusing is attained after turn-ON of the release switch S2, the control microcomputer 1 carries out an exposure operation on the basis of the calculated aperture value and shutter speed.

Display in the interrupt routine

When the ISO setting switch $S_{ISO}$ is used as the start switch for advancing the operation program to the interrupt routine (INT) from the reset routine (RESET), the set ISO value is displayed by the display means 7 in the interrupt routine (INT) so long as the switch $S_{ISO}$ is kept turned ON. When the switch $S_{ISO}$ is turned OFF, the set ISO value continues to be displayed in the steps (a7) to (a14), while the aperture value and shutter speed determined by the step (a14) or (a15) are displayed by the dislay means 7 in the closed loop of the steps (a13) to (a19). When the operation program proceeds to STOP through the step (a8), the ISO value 100 is displayed by the display means 7 (prompting the camera operator to set the ISO value of the film being used) until the ISO setting switch $S_{ISO}$ is turned ON. If any of the switches $(S_1)$ $(S_{ISO})$ $(S_{IV})$ is not turned ON in the closed loop of the steps (a13) to (a19), the input terminals (IP2), (IP4) and (IP5) respectively receive a "L" signal. Then the control microcomputer 1 is immediately halted to stop the operation. When the control microcomputer 1 is restarted and the operation program enters the interrupt routine (INT) again, the aperture value and shutter speed determined at the step (a14) or (a15) is displayed from the beginning.

The above explanation is given of a preferred embodiment of the present invention but the present invention is not restricted thereto. For example, the release inhibition signal RIS may be a signal to inhibit a release operation to assure that a desired number of pictures can be taken in a second for cameras that have a built-in motor drive device or use an attachable motor drive device. More particularly, assume that the camera can be set to change the number of pictures to be taken in a second and can always effect a film winding-up and shutter cocking operation at a predetermined maximum speed independently of the change of the number of pictures to be taken. In such a camera, if the number of pictures to be taken in a second is set to be less than the achievable maximum number, a time interval must be put between completion of a film winding-up operation and start of a succeeding exposure operation; it is therefore necessary to inhibit the camera from being released during time interval. Thus the release inhibition signal is used for this purpose. Alternatively, in the case of a camera which is provided with a built-in electronic flash device or adapted to use an attachable electronic flash device, the release inhibition signal RIS may be a signal sent from the flash device to indicate that the flash device is not ready for flashing. Moreover, the release inhibition signal may be a signal sent from any accessory device attachable to a camera to indicate that the device is not ready for normal operation.

In the above explained embodiment, the film counter mechanism and the film counter switch $S_{CNT}$ may be replaced with an electric circuit means. Such an electric circuit means may include an electric counter adapted to electrically count the number of frames of a film wound-up and an electric display device such as a liquid crystal display device driven by the counter. The counter should have an electronic switch correponding to the film counter switch $S_{CNT}$ and adapted to generate an electric signal that changes from a first state to a second state upon transfer to the normal photographing condition. Moreover, any switch other than the switches $S_1$ and $S_{ISO}$, which is associated with control of the camera, may be used as a start switch for starting the control microcomputer 1. Examples of such a start switch are a display switch which is turned-ON to have the camera make a display and a mode change-over switch which is changed-over to select an exposure control mode.

What is claimed is:

1. A camera which is adapted to be transferred to a normal photographing condition through winding-up of a film contained in a film cartridge by a predetermined length, said camera comprising:
   switch means changed over from a first state to a second state upon transfer of said camera to said normal photographing condition;
   determining means for determining whether or not said camera is in said normal photographing condition in response to said winding-up;
   signal generating means for generating a release inhibition signal under a condition of said camera in which it is undesirable to start an exposure operation; and
   release control means for inhibiting said camera from being released to start an exposure operation in response to said release inhibition signal when said determining means indicates that said camera is in the normal photographing condition while allowing said camera to be released independently of the generation of said release inhibition signal when said determining means indicates that said camera is not in said normal photographing condition.

2. A camera of claim 1, wherein said signal generating means includes automatic focus control means used for automatic focusing of said camera and adapted to generate said release inhibition signal until a proper focus condition is achieved thereby.

3. A camera of claim 1, further comprising:
detection means for detection of the transfer of said camera to said normal photographing condition in response to the change-over of said switch means from the first state to the second state;
code pattern reading means for reading a code pattern representing the sensitivity of the film if such a code pattern is provided on said film cartridge; and
reading control means for causing said reading means to read the code pattern upon the detection of the transfer of said camera to said normal photographing condition by said detection means.

4. A camera of claim 1, further comprising:
code pattern reading means for reading a code pattern representing the sensitivity of the film if such a code pattern is provided on said film cartridge;
film cartridge discriminating means for discriminating whether or not said film cartridge is of the type with said code pattern;
battery loading detection means for detecting whether or not a new battery is loaded in said camera in replacement of an old one;
manual film sensitivity setting means manually operable for allowing manual film speed setting;
means for causing said camera to start exposure calculation by a manual operation of said film sensitivity setting means when loading of said new battery is detected by said battery loading detection means where by said determining means indicates that said camera is in said normal photographing condition and said discrimination by said cartridge discriminating means indicates that said cartridge is not of the type with said code pattern.

5. A camera which is adapted to be transferred to a noraml photographing condition through a winding-up of a film contained in a film cartridge by a predetermined length, said camera comprising:
switch means changed over from a first state to a second state upon transfer of said camera to said normal photographing condition;
detection means for detecting transfer of said camera to said normal photographing condition based on the change-over of said switch means from the first state to the second state;
code pattern reading means for reading a code pattern representing the film sensitivity of said film when such a code pattern is provided on said film cartridge; and
reading control means for causing said code pattern reading means to read said code pattern upon the detection of the transfer of said camera to said normal photographing condition by said detection means.

6. A camera of claim 5, further comprising:
determining means for determining whether or not said camera is in said normal photographing condition in response to said winding-up;
exposure calculation means for effecting exposure calculation based on the film sensitivity represented by said code pattern read by said code pattern reading means; and
exposure control means for effecting exposure control based on the exposure calculation by said exposure calculation means when said determining means indicates that said camera is in said normal photographing condition while effecting exposure control at a predetermined shutter speed and aperture value when said determining means indicates that said camera is not in said normal photographing condition.

7. A camera of claim 6, wherein said predetermined shutter speed and aperture value are the fastest shutter speed and the maximum aperture value achievable by said camera.

8. A camera which is adapted to be transferred to a normal photographing condition through a winding-up of a film contained in a film cartridge by a predetermined length, said camera comprising:
switch means changed over from a first state to a second state upon transfer of said camera to said normal photographing condition;
determining means for determining whether or not said camera is in said normal photographing condition in response to said winding-up;
code pattern reading means for reading a code pattern representing the sensitivity of the film if such a code pattern is provided on said film cartridge;
film cartridge discriminating means for discriminating whether or not said film cartridge is of the type with said code pattern;
battery loading detection means for dtecting whether or not a new battery is loaded in said camera in replacement of an old one;
manual film sensitivity setting means manually operable for allowing manual film sensitivity setting; and
means for allowing said camera to start exposure calculation by a manual operation of said manual film sensitivity setting means when loading of said new battery is detected by said battery loading detection means where said determining means indicates that said camera is in said normal photographing condition and the discrimination by said cartridge discriminating means indicates that said film cartridge is not of the type with said code pattern.

9. A camera of claim 8, further comprising:
manual camera starting means manually operable for causing said camera to start exposure calculation; and
means for inhibiting said camera from starting exposure calculation by an operation of said manual camera starting means when loading of said new battery is detected by said battery loading detection means where said determining means indicates that said camera is in said normal photographing condition and the discrimination by said cartridge discriminating means indicates that said film cartridge is not of the type with said code pattern, said inhibition means being disabled whenever said determining means indicates that said camera is not in said normal photographing condition.

10. A camera of claim 9, further comprising: reading control means for causing said code pattern reading means to read said code pattern upon loading of a battery in said camera.

11. A camera of claim 9, further comprising a release member which is adapted to be operated through a first stage to a second stage for causing said camera to start exposure operation, and wherein said manual camera starting means includes a switch changed over from a first state to a second state for causing said camera to start exposure calculation when said release member is operated up to the first stage.

* * * * *